(12) United States Patent
Gruber

(10) Patent No.: US 8,549,203 B2
(45) Date of Patent: Oct. 1, 2013

(54) MULTI-PROTOCOL BUS INTERFACE DEVICE

(75) Inventor: Hans Georg Gruber, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 12/915,305

(22) Filed: Oct. 29, 2010

(65) Prior Publication Data

US 2012/0110234 A1      May 3, 2012

(51) Int. Cl.
G06F 13/14      (2006.01)
(52) U.S. Cl.
USPC .......................................................... 710/305
(58) Field of Classification Search
USPC .......................................................... 710/305
See application file for complete search history.

(56) References Cited

U.S. PATENT DOCUMENTS

| | | | |
|---|---|---|---|
| 5,751,975 A | 5/1998 | Gillespie et al. | |
| 7,376,147 B2 * | 5/2008 | Seto et al. | 370/465 |
| 7,480,786 B1 * | 1/2009 | Crabill | 712/34 |
| 7,765,019 B2 | 7/2010 | Sinai | |
| 2002/0199019 A1 * | 12/2002 | Battin et al. | 709/245 |
| 2003/0056043 A1 | 3/2003 | Kostadinov | |
| 2009/0316724 A1 * | 12/2009 | Muukki et al. | 370/469 |
| 2010/0191995 A1 * | 7/2010 | Levy et al. | 713/323 |
| 2010/0205412 A1 * | 8/2010 | McLeod | 712/225 |
| 2011/0199909 A1 * | 8/2011 | Walley et al. | 370/241 |
| 2011/0276975 A1 * | 11/2011 | Brown et al. | 718/103 |

FOREIGN PATENT DOCUMENTS

WO      2010055347 A1      5/2010

OTHER PUBLICATIONS

Kenneth Boyce, An Introduction to the Mobile Industry Processor Interface (MIPI) Alliance Standard sERIAL lOW-POWER iNTERCHIP mEDIA bUS (slimBUS), 2007, mipi aLLIANCE, iNC.*
International Search Report and Written Opinion—PCT/US2011/058148—ISA/EPO—Feb. 14, 2012.
Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

* cited by examiner

*Primary Examiner* — Paul R Myers
*Assistant Examiner* — Christopher A Daley
(74) *Attorney, Agent, or Firm* — Espartaco Diaz Hidalgo

(57) ABSTRACT

A bus interface device is configured to receive data from one or more devices via a bus. The bus interface device is also configured to process first data received via the bus according to a transport protocol of the bus. The bus interface device is further configured to process second data received via the bus according to a native coding/decoding (CODEC) protocol that is distinct from the transport protocol.

22 Claims, 7 Drawing Sheets

MULTI-PROTOCOL BUS INTERFACE DEVICE

FIELD

The present disclosure is generally related to bus interface devices.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

A master-slave architecture is often used to manage various hardware components in computing devices. In a typical master-slave architecture, a master component controls and processes information transmitted by multiple slave components. Since master and slave components may be manufactured by different parties, successful implementation of the architecture may involve coordination between various manufacturers, which may be difficult and time-consuming.

SUMMARY

The serial low-power inter-chip media bus (SLIMbus) standard is a bus standard well-suited for application in portable computing devices such as mobile phones. Communication between devices via SLIMbus is conventionally implemented by coupling a bus master (e.g., SLIMbus master) to a host (e.g., a processor) and a bus slave (e.g., SLIMbus slave) at each slave device (e.g., coding/decoding (CODEC) devices). For example, to make a CODEC available for use with SLIMbus, the CODEC's manufacturer may implement a SLIMbus slave, SLIMbus master, or SLIMbus master/slave (e.g., a device that may function interchangeably as a master or a slave) that is interposed between the CODEC and the SLIMbus and that converts the CODEC data into SLIMbus protocol data. When the SLIMbus is used with multiple CODECs, each CODEC includes a SLIMbus slave device, which increases complexity of each CODEC and prevents the use of off-the-shelf CODECs that do not include SLIMbus slaves. Alternately, a SLIMbus may be used as a dedicated communication bus between a host that includes a SLIMbus master and a single CODEC that does not include a SLIMbus slave. In this configuration, the SLIMbus master may only be connected to a single CODEC, limiting scalability.

The present disclosure describes a system and method that enables communication between a bus interface device (e.g., a SLIMbus master) and multiple components including at least one slave-less component (e.g., a CODEC that does not include a SLIMbus slave). The system and method may provide a scalable architecture that permits configurations including multiple off-the-shelf CODECs that do not have SLIMbus slaves, multiple other devices that include SLIMbus slaves, and a SLIMbus master. The SLIMbus master may process data that is formatted in accordance with native CODEC protocols as well as data that is formatted in accordance with the SLIMbus transport protocol.

In a particular embodiment, a device includes a bus interface device configured to receive data from one or more other devices via a bus. The bus interface device is configured to process first data that is received via the bus according to a transport protocol of the bus. The bus interface device is also configured to process second data that is received via the bus according to a native CODEC protocol that is distinct from the transport protocol.

In another particular embodiment, the device includes a compressor configured to determine, based on a preamble portion of the second data, whether the second data corresponds to the native CODEC protocol. If the second data corresponds to the native CODEC protocol, the compressor removes native CODEC protocol control data from the second data. In other embodiments, the device may also include a decompressor configured to receive third data to be sent via the bus according to the native CODEC protocol and to add native CODEC protocol control data to the third data.

In another particular embodiment, a method includes compressing data that is formatted in accordance with an international electrotechnical commission (IEC) 60958 (S/PDIF) protocol and that is received via a SLIMbus data line. Compressing the data includes removing control data from the received data. In another embodiment, the method includes decompressing second data to be sent via the SLIMbus data line, where decompressing the data includes adding control data in accordance with the S/PDIF protocol to the second data prior to sending the second data over the SLIMbus data line.

Particular advantages provided by at least one of the disclosed embodiments include an ability to process data at a bus interface device that may be transmitted in one of a plurality of protocols, including a bus transport protocol and one or more native CODEC protocols.

Other aspects, advantages, and features of the present disclosure will become apparent after review of the entire application, including the following sections: Brief Description of the Drawings, Detailed Description, and the Claims.

I. BRIEF DESCRIPTION OF THE DRAWINGS

II. DETAILED DESCRIPTION

Figure 1:
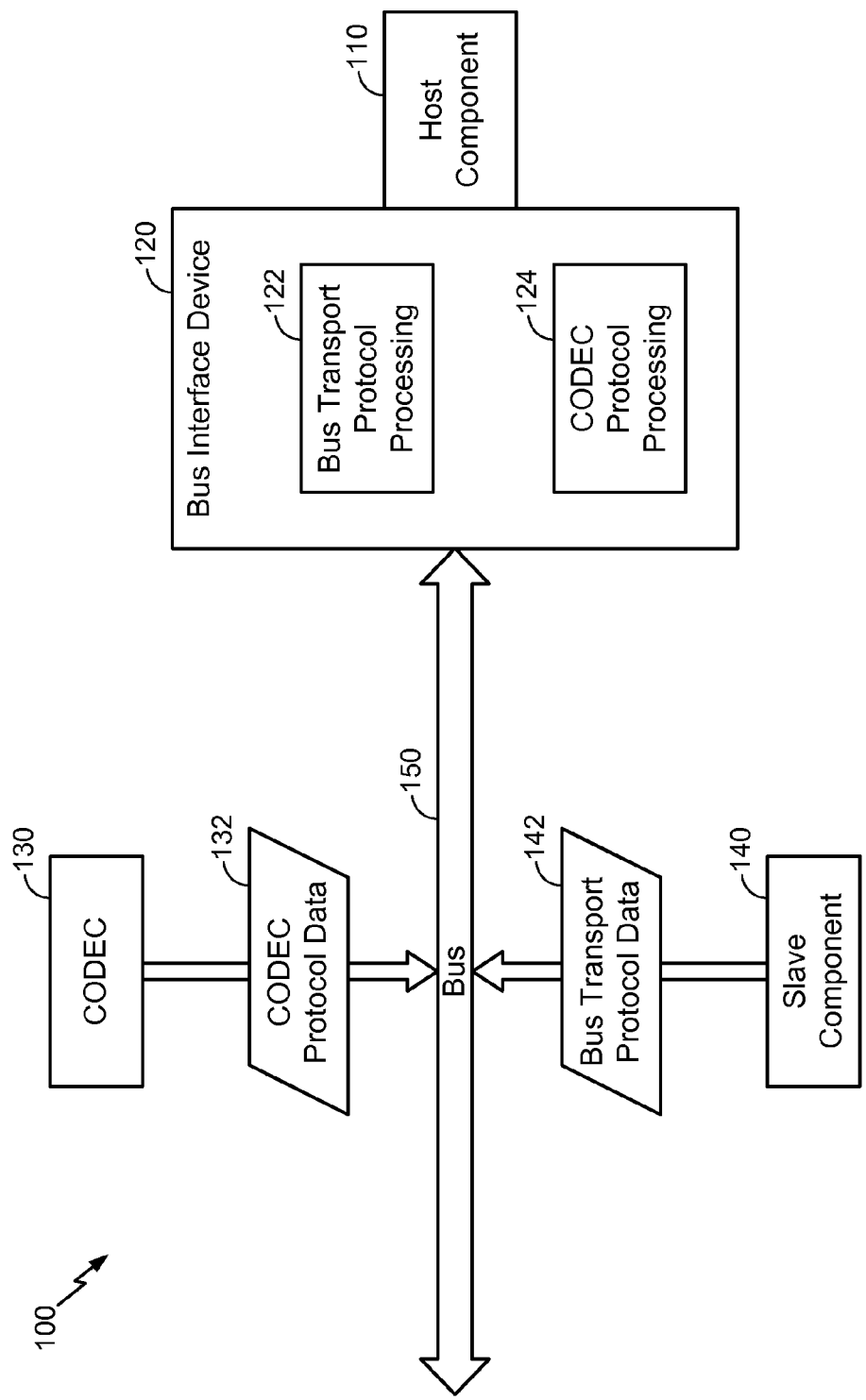
FIG. 1 is a block diagram of an illustrative embodiment of a system including a bus interface device operable to process data in accordance with multiple protocols.

FIG. 1 depicts an illustrative embodiment of a system 100 including a bus interface device 120 operable to process data in accordance with multiple protocols. The bus interface device 120 may be coupled to a host component 110 (e.g., a processor). The bus interface device 120 may also be coupled, via a bus 150, to CODECs (e.g., an illustrative CODEC 130) and other slave components (e.g., an illustrative slave component 140). In a particular embodiment, the system 100 may be integrated into an electronic device such as a wireless phone.

The CODEC 130 may be operable to code and decode data in accordance with a CODEC protocol. The CODEC 130 may be a hardware-implemented audio CODEC, such as an S/PDIF codec, an integrated interchip sound ($I^2S$) codec, or a pulse-code modulation (PCM) codec. Alternately, the CODEC 130 may be a hardware-implemented video codec, such as a moving picture experts group-4 (MPEG-4) codec or a VP6 flash video codec. The CODEC 130 may transmit CODEC protocol data 132 to the host component 110 via the bus 150 in accordance with a native CODEC protocol of the CODEC 130. For example, the CODEC 130 may be an S/PDIF CODEC and may transmit S/PDIF data to the host component 110 via the bus 150.

The slave component 140 may be a CODEC or some other hardware component that is configured to communicate with the host component 110. In a particular embodiment, the slave component 140 is configured to communicate using a transport protocol of the bus 150. For example, the slave component 140 may transmit bus transport protocol data 142 to the host component 110 via the bus 150.

The bus interface device 120 may receive data that is transmitted to the host component 110 from one or more other devices or components via the bus 150. The bus interface device 120 may also transmit data from the host component 110 to the CODEC 130 and to the slave component 140 via the bus 150. The bus interface device 120 may operate on data that is formatted in accordance with a variety of protocols. For example, the bus interface device 120 may include a bus transport protocol processing block 122 configured to send, receive, and process data, such as the bus transport protocol data 142, in accordance with the transport protocol of the bus 150. The bus interface device 120 may also include a CODEC protocol processing block 124 configured to send, receive, and process data, such as the CODEC protocol data 132, in accordance with a native CODEC protocol.

It should be noted that although the particular embodiment illustrated in FIG. 1 depicts a single CODEC and a single slave component, any number of CODECs and slave components may be coupled to the bus 150. For example, the system 100 of FIG. 1 may be scaled to support a second CODEC and a second native CODEC protocol by implementing a second CODEC protocol processing block (not shown) at the bus interface device 120.

In operation, the bus interface device 120 may process data that is transmitted in accordance with multiple protocols via the bus 150. For example, the CODEC protocol processing block 124 may process incoming or outgoing codec protocol data 132 that is transmitted from or to the CODEC 130 in accordance with the native CODEC protocol. As another example, the bus transport protocol processing block 122 may process incoming or outgoing bus transport protocol data 142 that is transmitted from or to the slave component 130 in accordance with the transport protocol of the bus 150.

It will be appreciated that by handling protocol operations, such as data formatting and translation at the bus interface device 120, the system 100 of FIG. 1 may enable the host component 110 to operate on data received in accordance with multiple protocols via a single bus 150. It will also be appreciated that by handling protocol operations, such as data formatting and translation at the bus interface device 120, the system 100 of FIG. 1 may enable the bus 150 to be used with components (e.g., off-the-shelf components) that were not specifically developed for use with the bus 150 (e.g., components that transmit data in a native CODEC protocol instead of the transport protocol of the bus).

It should also be noted that although the particular embodiment illustrated in FIG. 1 depicts the protocol processing blocks 122, 124 as part of the bus interface device 120, the protocol processing blocks 122, 124 may alternately be located at the slave component 140 and the CODEC 130, respectively. This alternate embodiment may enable the system 100 to be constructed using an off-the-shelf bus interface device, whereas the embodiment illustrated in FIG. 1 may enable the system 100 to be constructed using off-the-shelf CODECs and other off-the-shelf components.

It should further be noted that although the particular embodiment illustrated in FIG. 1 depicts the processing blocks 122, 124 as hardware blocks that are part of the bus interface device 120, the system 100 may alternately include software processing of data. For example, a processor (e.g., at the host component 110) may execute software instructions that enable the bus interface device 120 to recognize and process the CODEC protocol data 132 and the transport protocol data 142. Such a software implementation may enable the use of off-the-shelf bus masters and off-the-shelf slaves at the cost of increased processing time (e.g., since software decoding may be slower than hardware decoding).

Figure 2:
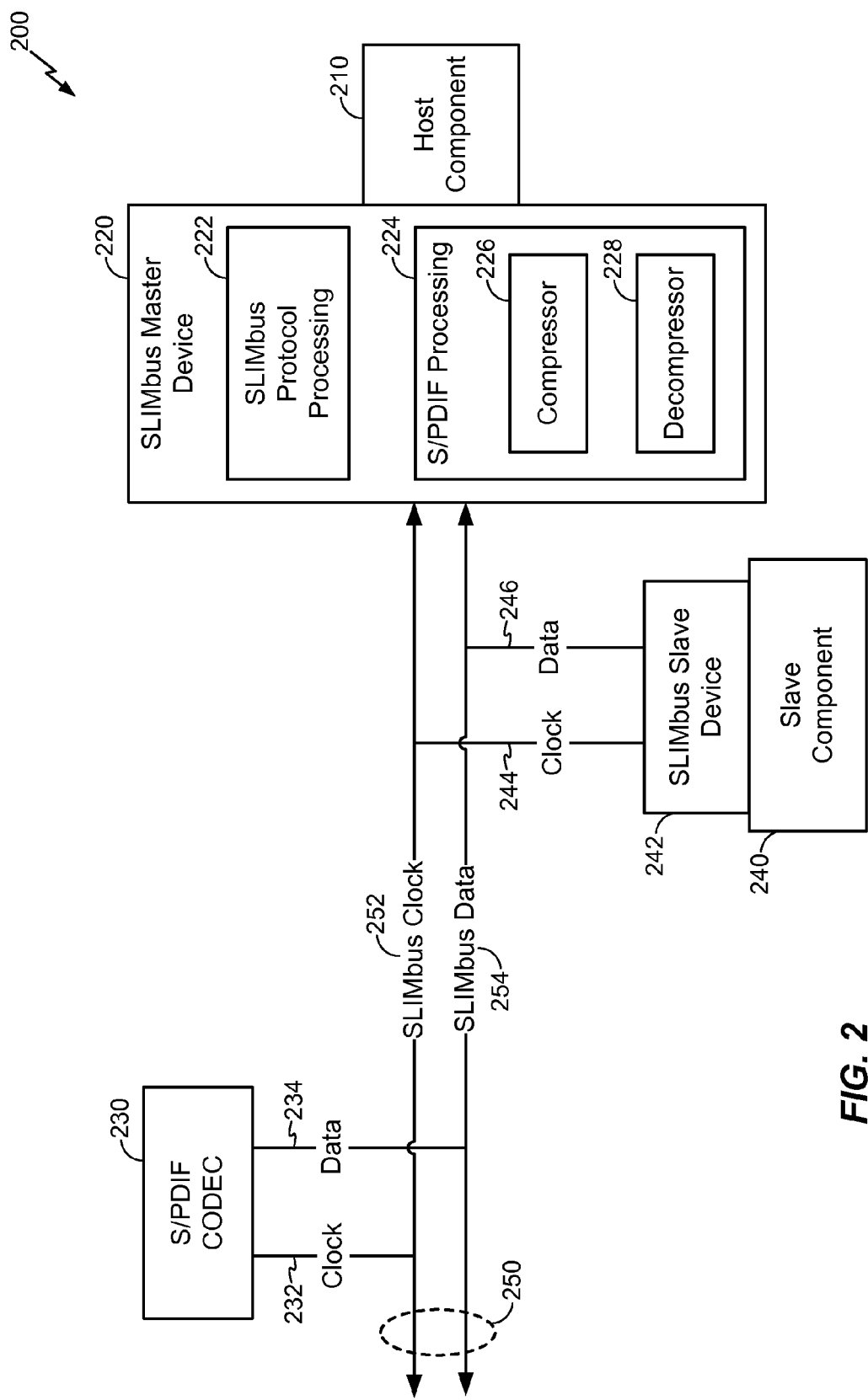
FIG. 2 is a block diagram to illustrate a particular embodiment of the system of FIG. 1 that is operable in a serial low-power inter-chip media bus (SLIMbus) environment.

FIG. 2 is a block diagram to illustrate a particular embodiment of a system 200 that includes a SLIMbus master device 220 that is coupled to a SLIMbus 250 and that is configured to process data in accordance with multiple protocols. For example, the SLIMbus master device 220 may support processing of data in accordance with a SLIMbus transfer protocol of the SLIMbus 250 and processing of data in accordance with a native CODEC protocol that is distinct from the SLIMbus transfer protocol. The SLIMbus master device 220 may be responsible for functions such as device enumeration and channel allocation.

The system 200 may include an S/PDIF CODEC 230 coupled to the SLIMbus 250. The S/PDIF CODEC 230 may transmit and receive data in accordance with the S/PDIF protocol (e.g., independent of the SLIMbus transfer protocol) to and from the host component 210 via the SLIMbus 250. In a particular embodiment, the S/PDIF CODEC 230 receives a clock signal via an S/PDIF clock line 232 that is connected to a SLIMbus clock line 252 of the SLIMbus 250. The S/PDIF CODEC 230 may also include an S/PDIF data line 234 that is connected to a SLIMbus data line 254, where the S/PDIF data line 234 facilitates two-way S/PDIF protocol communication via the SLIMbus 250. In an illustrative embodiment, S/PDIF data communicated over the SLIMbus data line 254 is formatted as described and illustrated with reference to FIG. 3.

The system 200 may further include a slave component 240 coupled to the SLIMbus 250. The slave component 240 may transmit and receive data in accordance with the SLIMbus transfer protocol to and from the host component 210 via the SLIMbus 250. A SLIMbus slave device 242 may be interposed between the slave component 240 and the SLIMbus 250. In a particular embodiment, the SLIMbus slave device 242 is included in the slave component 240. The SLIMbus slave device 242 may receive a clock signal via a clock line 244 that is connected to the SLIMbus clock line 252 of the SLIMbus 250. The SLIMbus slave device 242 may also include a data line 246 that is connected to the SLIMbus data line 254; the data line 246 facilitates two-way SLIMbus protocol communication via the SLIMbus 250.

The SLIMbus master device 220 may receive data transmitted to the host component 210 via the SLIMbus 250. The SLIMbus master device 220 may also transmit data from the host component 210 via the SLIMbus 250. The SLIMbus master device 220 may thus process data in accordance with multiple protocols. For example, the SLIMbus master device 220 may include a SLIMbus protocol processing block 222 that processes data (e.g., data from the SLIMbus slave device 242) that is received in accordance with the SLIMbus transfer protocol. The SLIMbus master device 220 may also include an S/PDIF processing block 224 that processes data (e.g., data from the S/PDIF CODEC 230) that is received in accordance with the S/PDIF protocol.

In a particular embodiment, the S/PDIF processing block 224 includes a compressor 226 and a decompressor 228. The compressor 226 may perform data manipulation operations on incoming data that is transmitted to the host component 210 from the S/PDIF CODEC 230. For example, the compressor 226 may be operable to determine, based on a preamble portion of received data, whether the received data is S/PDIF data. The compressor 226 may also be operable to remove native S/PDIF protocol control data from the received data. Native S/PDIF protocol control data may include prefix and suffix control bits that are added to S/PDIF data packets as defined by the S/PDIF standard. Upon determining that the received data is S/PDIF data, the compressor 226 may remove the control bits before passing the received data to the host component 210.

The decompressor 228 may manipulate data transmitted by the host component 210 to the S/PDIF CODEC 230. For example, the decompressor 228 may be operable to receive, from the host component 210, outgoing data to be sent in accordance with the S/PDIF codec protocol. The decompressor 228 may add native S/PDIF protocol control data to the outgoing data. S/PDIF control data is further described and illustrated with reference to FIG. 3. For example, the S/PDIF CODEC 230 may expect to receive S/PDIF data, but the host component 210 may be configured to transmit protocol-agnostic data. The decompressor 228 may add S/PDIF control bits to the protocol-agnostic data, thereby converting the protocol-agnostic data into the S/PDIF data that is expected by the S/PDIF CODEC 230. Thus, a single component (e.g., the SLIMbus master device 220) may handle protocol conversion operations, such as the addition and removal of control data. This may enable manufacturers to use off-the-shelf components to implement other parts of the system 200 (e.g., the host component 210, the S/PDIF CODEC 230, and the slave component 240).

It should be noted that the particular configuration depicted in FIG. 2 is for illustrative purposes only. In particular embodiments, SLIMbus master and slave duties may be relocated within the system 200. For example, during operation at the system 200, the SLIMbus master device 220 may hand over master duties to the SLIMbus device 242. The SLIMbus master device 220 may thereby transition into a "slave-like" mode and the SLIMbus device 242 may effectively function as a SLIMbus master device. When such a transition occurs, the host component 210 may function as a SLIMbus slave component and the component 240 may become the SLIMbus master/host component. Thus, although various components and devices are described and illustrated herein are designated as "master" and "slave," such components may in fact be "master/slave" components and devices. For example, more than one device in the system 200 of FIG. 2 may include a compressor and decompressor, and which particular compressor and decompressor are used may depend on the master/slave handover process. It will be appreciated that interchangeability of master and slave functionality may provide CODEC manufacturers with greater flexibility in how to make CODECs available for use with SLIMbus. The manufacturers may have the choice to add a SLIMbus master (or master/slave) device instead of a dedicated SLIMbus slave device to their CODECs.

In operation, the SLIMbus master device 220 may process data that is transmitted in accordance with multiple protocols via the SLIMbus 250. For example, the S/PDIF processing block 224 may process incoming or outgoing data that is transmitted from or to the S/PDIF CODEC 230 in accordance with the S/PDIF protocol. As another example, the SLIMbus protocol processing block 222 may process incoming or outgoing data that is transmitted from or to the slave component 230 in accordance with the SLIMbus transport protocol.

It will be appreciated that by providing data manipulation and processing at the SLIMbus master device 220, the system 200 of FIG. 2 may enable the use of a single SLIMbus 250 with multiple components (e.g., the S/PDIF CODEC 230 and the slave component 240), where some components have a SLIMbus-compliant slave device and other components do not have a SLIMbus-compliant slave device. The system 200 of FIG. 2 may thus be compatible with off-the-shelf components not specifically developed in accordance with the SLIMbus standard, thereby reducing cost and complexity of implementing the SLIMbus architecture in a computing device (e.g., a wireless phone).

It should be noted that since the S/PDIF protocol and the SLIMbus standard each include a clock line and a data line, coupling the S/PDIF CODEC 230 to the SLIMbus 250 may be performed as shown in FIG. 2. However, the multiprotocol techniques disclosed herein may also be used with devices that have more, fewer, or different inputs/outputs than a clock line and a data line. In such situations, the inputs/outputs of the CODEC may be translated into SLIMbus clock and data signals at the CODEC, at the SLIMbus master device 220, or via software. The techniques disclosed herein may also be used with communication buses other than SLIMbus.

Figure 3:
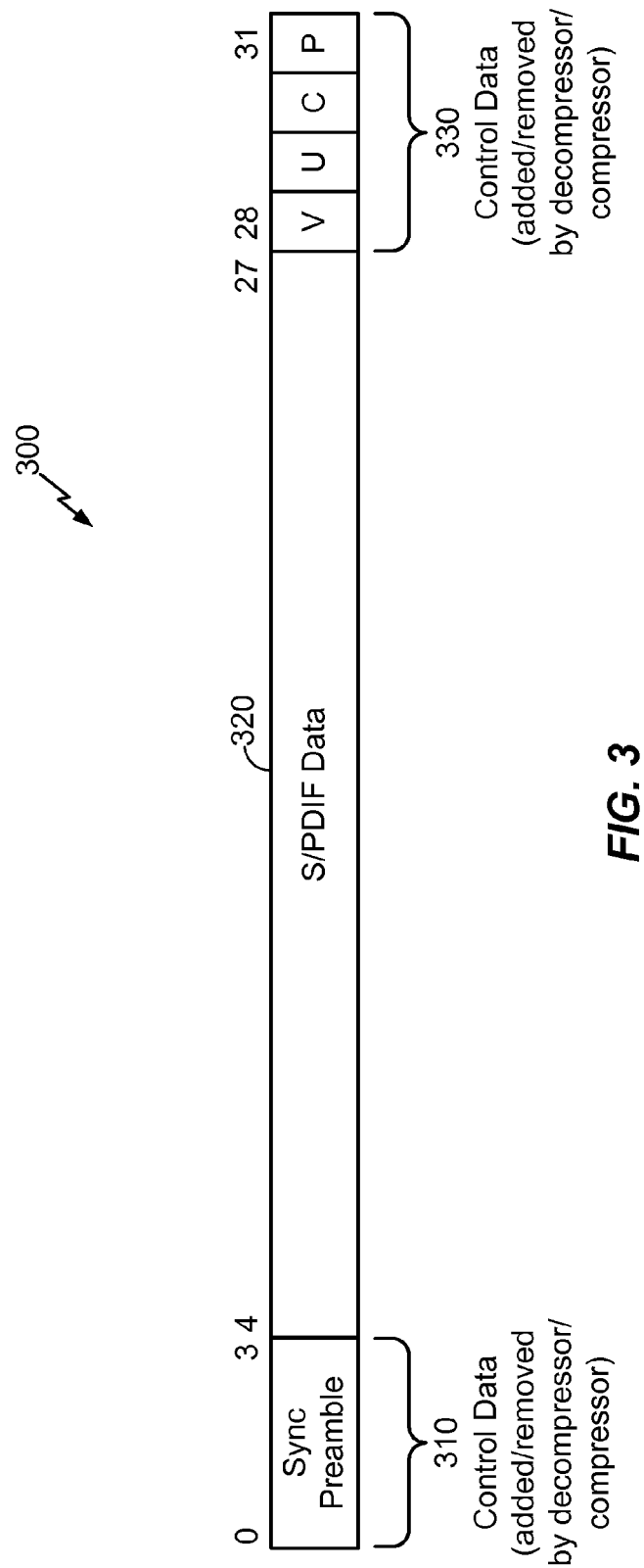
FIG. 3 is a diagram to illustrate a particular embodiment of international electrotechnical commission (IEC) 60958 (S/PDIF) data that may be processed by the system of FIG. 2.

FIG. 3 is a diagram to illustrate a particular embodiment of international electrotechnical commission (IEC) 60958 (S/PDIF) data that may be processed by the system of FIG. 2. An illustrative S/PDIF data word 300 is depicted in FIG. 3. For example, referring to FIG. 2, the S/PDIF data word 300 may be communicated between the S/PDIF CODEC 230 and the SLIMbus master device 220 via the SLIMbus data line 254 and the S/PDIF data line 234.

In a particular embodiment, the S/PDIF data word 300 is a 32-bit data word that is part of a larger S/PDIF data frame that includes 384 S/PDIF data words. For example, half (i.e., 192) of the S/PDIF data words may correspond to a first audio channel and the other half of the S/PDIF data words may correspond to a second audio channel.

The first four bits (e.g., bits 0-3) of the S/PDIF data word 300 may represent a synchronization preamble 310. In a particular embodiment, the synchronization preamble 310 represents native S/PDIF control data that is removed when the S/PDIF data word 300 is received via a SLIMbus by a SLIMbus master. For example, referring to FIG. 2, the compressor 226 may remove the sync preamble 310 from the S/PDIF data word 300 upon receiving the S/PDIF data word 300 from the S/PDIF CODEC 230. In another particular embodiment, the synchronization preamble 310 represents native S/PDIF control data that is added when the S/PDIF data word 300 is transmitted via a SLIMbus by a SLIMbus master. For example, referring to FIG. 2, the decompressor 228 may add the sync preamble 310 to the S/PDIF data word 300 prior to transmitting the S/PDIF data word 300 to the S/PDIF CODEC 230.

The last four bits (e.g., bits 28-31) of the S/PDIF data word 300 may represent an S/PDIF VUCP portion 330. For example, the S/PDIF VUCP portion 330 may include four bits: a Validity bit, a User bit, a Channel status bit, and a Parity bit. The Validity bit may indicate whether an audio sample that includes the S/PDIF data word 300 is valid. The User bit may carry user-specified coding information (e.g., track or song information). The Channel status bit may indicate channel information including a number of transmitted audio channels, a compression status, a copy permission, and an audio source category. The Parity bit may include error detection information.

In a particular embodiment, the S/PDIF VUCP portion 330 represents native S/PDIF control data that is removed when the S/PDIF data word 300 is received via a SLIMbus by a SLIMbus master. For example, referring to FIG. 2, the compressor 226 may remove the S/PDIF VUCP portion 330 from the S/PDIF data word 300 upon receiving the S/PDIF data word 300 from the S/PDIF CODEC 230. In another particular embodiment, the S/PDIF VUCP portion 330 represents native S/PDIF control data that is added when the S/PDIF data word 300 is transmitted via a SLIMbus by a SLIMbus master. For example, referring to FIG. 2, the decompressor 228 may add the S/PDIF VUCP portion 330 to the S/PDIF data word 300 prior to transmitting the S/PDIF data word 300 to the S/PDIF CODEC 230.

The middle 24 bits (e.g., bits 4-27) of the S/PDIF data word 300 may represent an S/PDIF data portion 320. The S/PDIF data portion 320 may represent non-control data. Thus, the S/PDIF data portion 320 may be retained during compression and decompression operations at a SLIMbus master (e.g., the SLIMbus master device 220 of FIG. 2).

Figure 4:
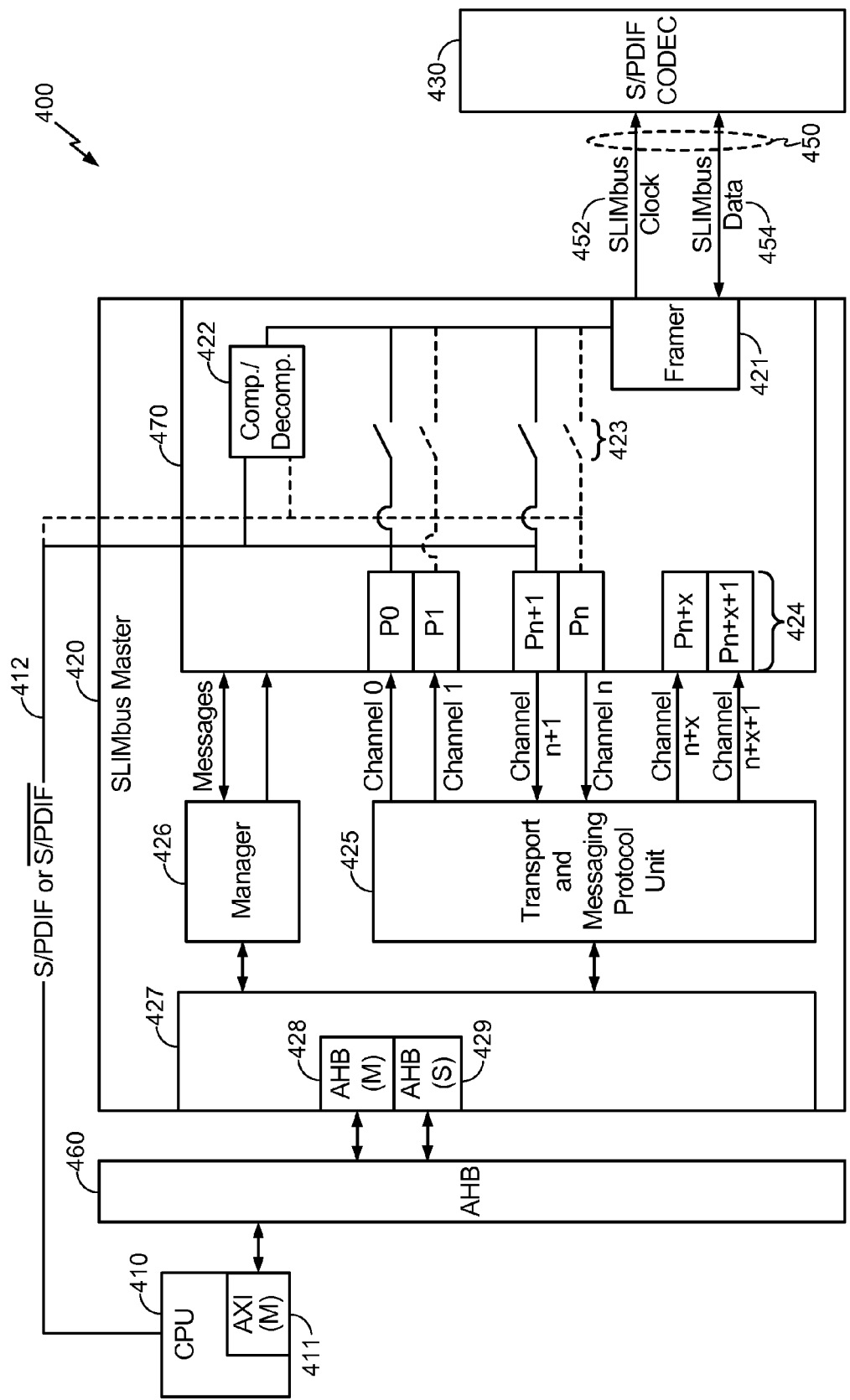
FIG. 4 is a diagram to illustrate a particular embodiment of the SLIMbus master device of FIG. 2.

FIG. 4 is a diagram to illustrate a particular embodiment of a system 400 that includes a SLIMbus master device 420 that is coupled to a SLIMbus 450 and that is configured to process data in accordance with multiple protocols. In an illustrative embodiment, the SLIMbus master device 420 is the SLIMbus master device 220 of FIG. 2.

The SLIMbus master device 420 may be coupled to an S/PDIF CODEC 430 via a SLIMbus clock line 452 and a SLIMbus data line 454 that provide physical layer (i.e., Open Systems Interconnection (OSI) layer-1) connectivity and transmission of data. In an illustrative embodiment, the S/PDIF CODEC 430 is the S/PDIF CODEC 230 of FIG. 2. A host unit 470 of the SLIMbus master device 420 may include a framer 421 and a compressor/decompressor 422 that process S/PDIF data (e.g., the S/PDIF data word 300 of FIG. 3) received from the S/PDIF CODEC 430. The framer 421 may provide data link layer (e.g., layer-2) processing of data. In a particular embodiment, the framer 421 provides a clock signal to all devices (e.g., the S/PDIF CODEC 430 and other devices not shown) coupled to the SLIMbus master device 420 via the SLIMbus 420. The compressor/decompressor 422 may remove S/PDIF control data (e.g., the synchronization preamble 310 and S/PDIF VUCP portion 330 of FIG. 3) from incoming data and may add S/PDIF control data to outgoing S/PDIF data.

Based on a preamble of the S/PDIF data (e.g., the synchronization preamble 310 of FIG. 3), switches 423 of the SLIMbus master device 420 may be opened or closed and a S/PDIF data indicator 412 may be set. For example, when the preamble indicates that the data is S/PDIF data, different switches 423 may be opened or closed to couple the framer 421 and the compressor/decompressor 422 to particular ports 424. A first set of the ports 424 may be configured for S/PDIF data and a second set of the ports 424 may be configured for other data (e.g., SLIMbus transfer protocol data or other CODEC data). The S/PDIF data indicator 412 may indicate to a central processing unit (CPU) 410 whether incoming data is S/PDIF data. The S/PDIF data indicator 412 may also indicate to the SLIMbus master device 420 whether outgoing data is S/PDIF data.

The ports 424 may be coupled to a transport and messaging protocol unit 425 that encodes and decodes message protocol and transport protocol information. The transport and messaging protocol unit 425 may provide higher level (e.g., layer-3 and up) processing at the SLIMbus master 420). The transport and messaging protocol unit 425 may be coupled to data transmission circuitry 427. For example, the data transmission circuitry 427 may include direct memory access (DMA) circuitry that processes data in accordance with a first-in-first-out (FIFO) protocol. The data transmission circuitry 427 may also be coupled to a manager 426. The data transmission circuitry 427 may include master and slave advanced high-performance buses (AHBs). For example, the data transmission circuitry 427 may include a master AHB 428 and a slave AHB 429. The AHBs 428-429 may be coupled to the CPU 410 via another AHB 460. In a particular embodiment, the CPU 410 includes an advanced extensible interface 411 that communicates with the SLIMbus master device 420 via the AHB 460.

During operation, the SLIMbus master 420 may determine whether incoming or outgoing data is S/PDIF data. When the data is S/PDIF data, the compressor/decompressor 422 may remove or add S/PDIF control information to the data. For example, S/PDIF control information may be removed from incoming data before the incoming data is routed to particular ports 424. As another example, S/PDIF control information may be added to outgoing data before the outgoing data is transmitted via the SLIMbus 450.

It will be appreciated that the system 400 of FIG. 4 may provide a SLIMbus master device 420 that is operable to process data transmitted in accordance with multiple protocols via the SLIMbus 450. In a particular embodiment, the SLIMbus master device 420 may be generated by adding logic to an off-the-shelf SLIMbus master. For example, a preamble register, a trailer (e.g., VUCP) register, a preamble comparator, and decision logic may be added to the off-the-shelf SLIMbus master. Therefore, implementing the SLIMbus master device 420 of FIG. 4 may involve the addition of few (e.g., several hundred) gates. In contrast, adding a SLIMbus slave component to a CODEC may involve the addition of fifty to seventy thousand gates.

It should be noted that although FIG. 4 illustrates hardware components, similar functionality may instead by achieved via software. For example, particular ports of the SLIMbus master 420 may be designated as dedicated S/PDIF ports. Software instructions may be executed to examine the preamble of data transmitted via the SLIMbus, to determine whether to add or remove control data, and to determine whether to route the data to the dedicated S/PDIF ports or to other ports.

Figure 5:
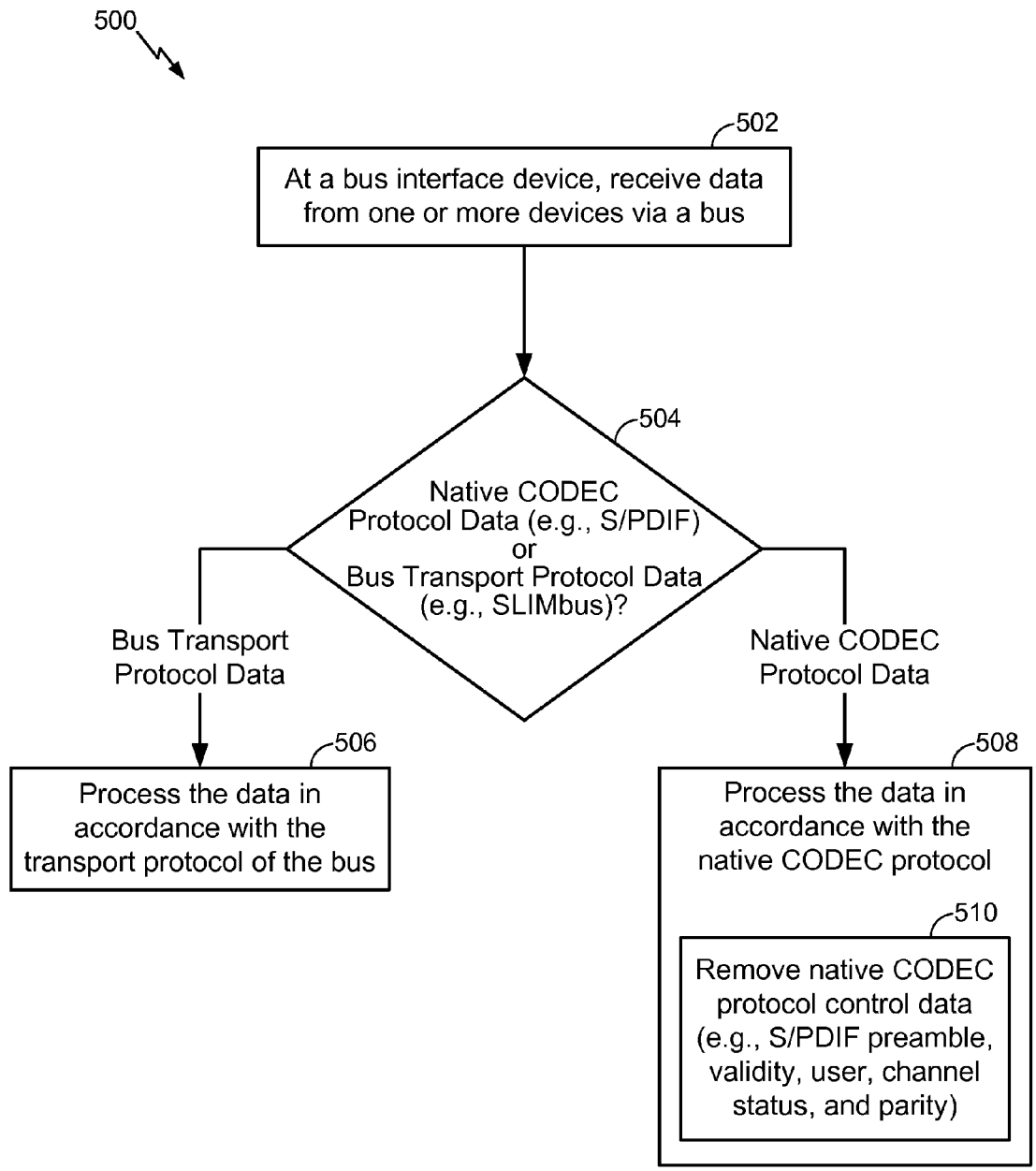
FIG. 5 is a flow diagram to illustrate a particular embodiment of a method of receiving data at a bus interface device that is operable to process data in accordance with multiple protocols.

FIG. 5 is a flow diagram to illustrate a particular embodiment of a method 500 of receiving data at a bus interface device that is operable to process data in accordance with multiple protocols. In an illustrative embodiment, the method 500 may be performed at the bus interface device 120 of FIG. 1 or the SLIMbus master device 220 of FIG. 2.

The method 500 includes receiving data from one or more devices at a bus interface device via a bus, at 502. For example, in FIG. 1, the bus interface device 120 may receive data from one or more of the CODEC 130 and the slave component 140. As another example, in FIG. 2, the SLIMbus master device 220 may receive data from one or more of the S/PDIF CODEC 230 and the slave component 240.

The method 500 also includes determining whether the received data is native CODEC protocol data or bus transport protocol data, at 504. In a particular embodiment, native CODEC protocol data includes S/PDIF data and bus transport protocol data includes SLIMbus data. For example, in FIG. 1, the bus interface device 120 may determine whether the received data is the CODEC protocol data 132 or the bus transport protocol data 142 (e.g., based on a preamble of the received data). As another example, in FIG. 2, the SLIMbus master device 220 may determine whether the received data is S/PDIF data or SLIMbus data.

When it is determined that the received data is bus transport protocol data, the method 500 processes the data in accordance with the transport protocol of the bus, at 506. For example, in FIG. 1, the bus transport protocol processing block 122 may process the data. As another example, in FIG. 2, the SLIMbus protocol processing block 222 may process the SLIMbus data. When it is determined that the received data is native CODEC protocol data, the method 500 processes the data in accordance with the native CODEC protocol, at 508. Processing the data includes removing native CODEC protocol control data, at 510. For example, in FIG. 1, the CODEC protocol processing block 124 may process the data, including removing native CODEC protocol control data from the data. In an illustrative embodiment, the native CODEC protocol control data includes a preamble portion, a validity portion, a user portion, a channel status portion, a parity portion, or any combination thereof. As another example, in FIG. 2, the S/PDIF processing block 224 may process the S/PDIF data, including removal of S/PDIF control data by the compressor 226. The processed data may be sent to a host component (e.g., the host component 110 of FIG. 1 or the host component 220 of FIG. 2).

Figure 6:
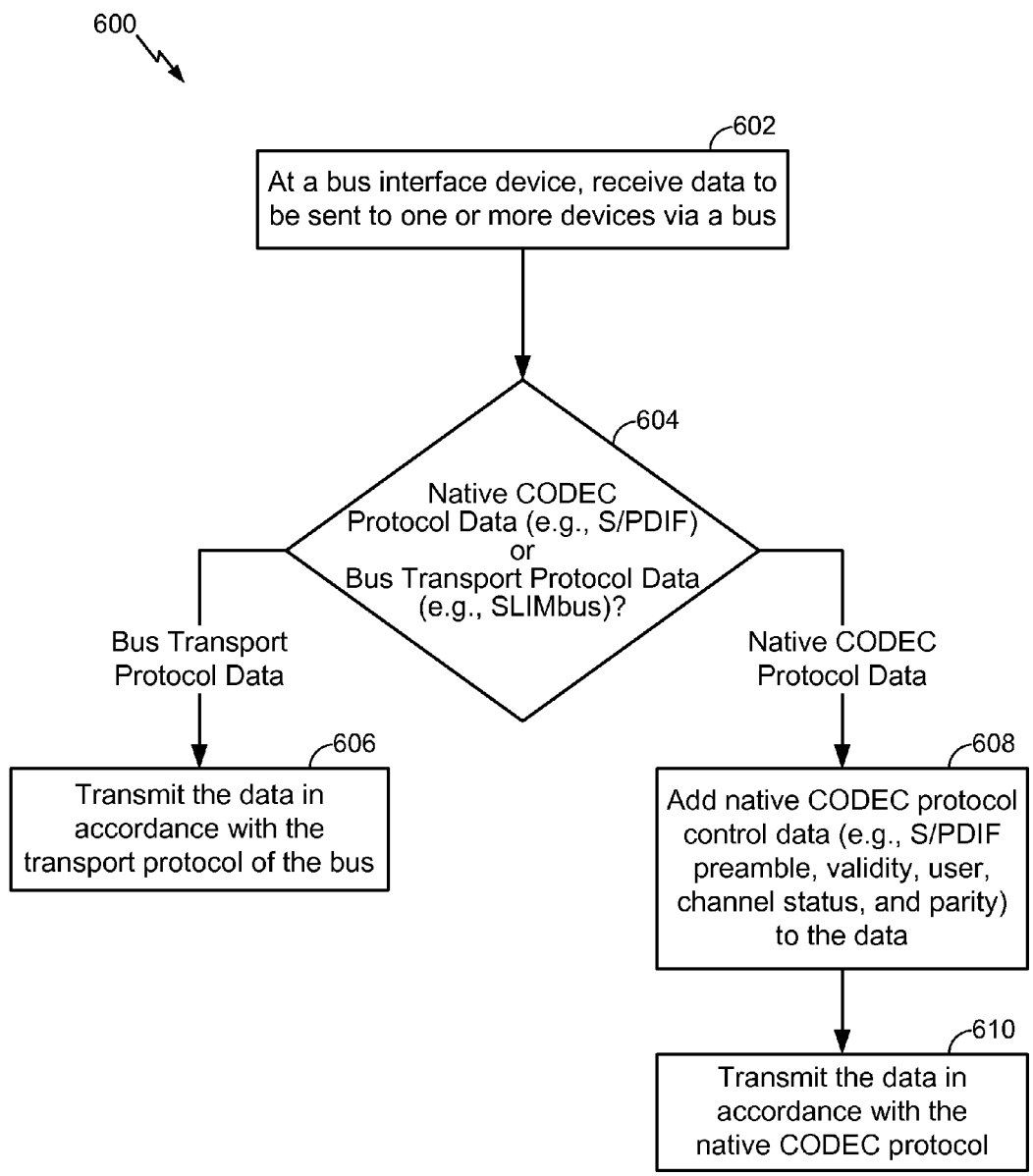
FIG. 6 is a flow diagram to illustrate a particular embodiment of a method of transmitting data at a bus interface device that is operable to process data in accordance with multiple protocols.

FIG. 6 is a flow diagram to illustrate a particular embodiment of a method 600 of transmitting data at a bus interface device that is operable to process data in accordance with multiple protocols. In an illustrative embodiment, the method 600 may be performed at the bus interface device 120 of FIG. 1 or a SLIMbus master, slave, or master/slave device (e.g., the SLIMbus master device 220 of FIG. 2).

The method 600 includes receiving, at a bus interface device, data to be sent to one or more devices via a bus, at 602. For example, in FIG. 1, the bus interface device 120 may receive data to be sent to one or more of the CODEC 130 and the slave component 140. As another example, in FIG. 2, the SLIMbus master device 220 may receive data to be sent to one or more of the S/PDIF CODEC 230 and the slave component 240.

The method 600 also includes determining whether the data is native CODEC protocol data or bus transport protocol data, at 604. In a particular embodiment, native CODEC protocol data includes S/PDIF data and bus transport protocol data includes SLIMbus data. For example, in FIG. 1, the bus interface device 120 may determine whether the data to be sent is CODEC protocol data or bus transport protocol data (e.g., based on a SLIMbus data indicator described with reference to the SLIMbus data indicator 412 of FIG. 4). As another example, in FIG. 2, the SLIMbus master device 220 may determine whether the data to be sent is S/PDIF data or SLIMbus data.

When it is determined that the data is bus transport protocol data, the method 600 transmits the data in accordance with the transport protocol of the bus, at 606. For example, in FIG. 1, the bus transport protocol processing block 122 may process the data for transmission. As another example, in FIG. 2, the SLIMbus protocol processing block 222 may process the SLIMbus data for transmission. When it is determined that the data is native CODEC protocol data, the method 600 adds native CODEC protocol control data to the data, at 618. For example, in FIG. 1, the CODEC protocol processing block 124 may add native CODEC protocol control data to the data. In an illustrative embodiment, the native CODEC protocol control data includes a preamble portion, a validity portion, a user portion, a channel status portion, a parity portion, or any combination thereof. As another example, in FIG. 2, the S/PDIF processing block 224 may process the S/PDIF data, including addition of S/PDIF control data by the decompressor 228.

The method 600 also includes transmitting the data in accordance with the native CODEC protocol, at 610. For example, in FIG. 1, the bus interface device 120 may transmit the data. As another example, in FIG. 2, the SLIMbus master device 220 may transmit the data.

Figure 7:
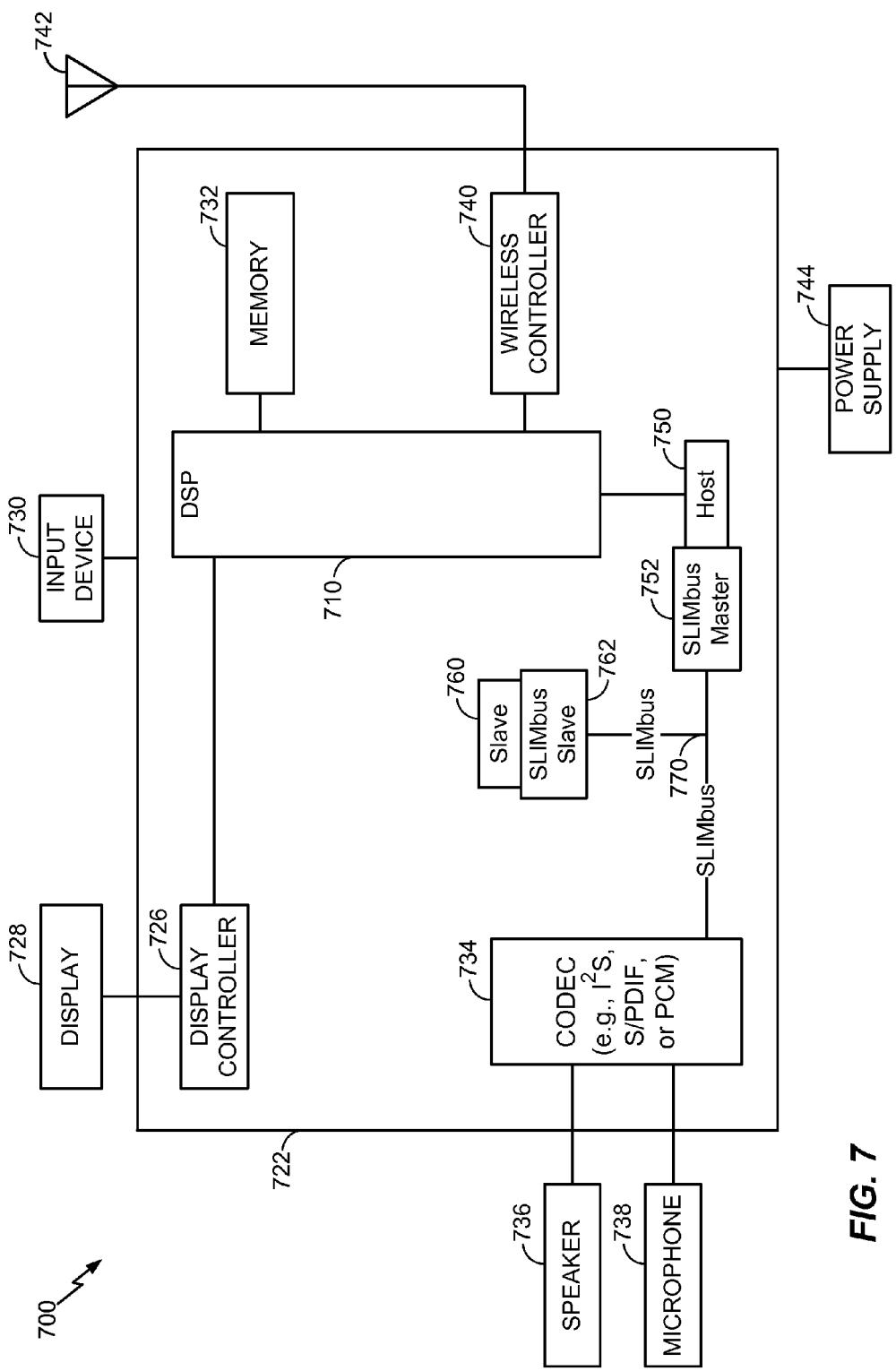
FIG. 7 is a diagram to illustrate a particular embodiment of an electronic device that includes a bus interface device operable to process data in accordance with multiple protocols.

FIG. 7 depicts a particular illustrative embodiment of a device 700 into which the system 100 of FIG. 1, the system 200 of FIG. 2, or the system 400 of FIG. 4 may be integrated. The device 700 may be an electronic device, such as a set-top box, an audio player, a video player, a navigation device, personal digital assistant (PDA), a communications device (e.g., a wireless mobile device), a computing device (e.g., a laptop computer, a tablet computer, a netbook computer, a smartbook computer, etc.), other type of device, or any combination thereof.

The device 700 may include a digital signal processor (DSP) 710 that provides processing functionality and supports other components of the device 700. A CODEC 734, a display controller 726, and a wireless controller 740 are coupled to the DSP 710. In an illustrative embodiment, the CODEC 734 is an $I^2S$ CODEC, an S/PDIF CODEC, or a PCM CODEC. For example, the CODEC 734 may be the CODEC 130 of FIG. 1, the S/PDIF CODEC 230 of FIG. 2, or the S/PDIF CODEC 430 of FIG. 4. The DSP 710 is also coupled to a memory 732. For example, the memory 732 may be a non-transitory computer-readable medium storing executable instructions that are executable by the DSP 710 to perform any of the methods described herein. In a particular embodiment, the memory 732 includes random access memory (RAM), cache-based memory, register-based memory, or any combination thereof.

The device 700 may also include a host component 750 and one or more slave components (e.g., an illustrative slave component 760). The host component 750 may be coupled to the DSP 710 and may also be coupled to or include a SLIMbus master device 752. The slave component 760 may be coupled to or include a SLIMbus slave device 762. The CODEC 734, the slave component 760, and the host component 750 may communicate with each other via a SLIMbus 770. For example, the CODEC 734 and the host component 750 may communicate via the SLIMbus 770 in accordance with a native CODEC protocol. As another example, the slave component 760 and the host component 750 may communicate via the SLIMbus 770 in accordance with the SLIMbus transfer protocol. In an illustrative embodiment, the slave component 760 is the slave component 140 of FIG. 1 or the slave component 240 of FIG. 2, and the SLIMbus slave device 762 is the SLIMbus slave device 242 of FIG. 2. In another illustrative embodiment, the host component 750 is the host component 110 of FIG. 1 or the host component 210 of FIG. 2, and the SLIMbus master device 752 is the bus interface device 110 of FIG. 1, the SLIMbus master device 220 of FIG. 2, or the SLIMbus master device 420 of FIG. 4.

The display controller 726 is coupled to a display 728. A speaker 736 and a microphone 738 can be coupled to the CODEC 734. The wireless controller 740 can be coupled to a wireless antenna 742. In a particular embodiment, the DSP 710, the display controller 726, the memory 732, the CODEC 734, the wireless controller 740, the host component 750, the SLIMbus master device 752, the slave component 760, the SLIMbus slave device 762, and the SLIMbus 770 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antenna 742, and the power supply 744 are external to the system-on-chip device 722. However, each of the display 728, the input device 730, the speaker 736, the microphone 738, the wireless antenna 742, and the power supply 744 can be coupled to a component of the system-on-chip device 722, such as an interface or a controller.

Thus, FIG. 7 depicts a particular embodiment of an implementation of a SLIMbus architecture supporting multiple protocols in an electronic device. The techniques disclosed herein may also be applicable to other electronic devices, such as set-top boxes, smartphones, laptop computers, netbook computers, tablet computers, smartbook computers, audio players, video players, and navigation devices.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device (e.g., a laptop computer) or a user terminal (e.g., a portable wireless device).

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
 a bus interface device configured to handle protocol operations to enable a device, coupled via the bus interface device to a single bus, to operate on data received in accordance with multiple protocols via the single bus, wherein the multiple protocols include a bus transport protocol of the single bus and a native coding/decoding (CODEC) protocol distinct from the bus transport protocol, the bus interface device being configured to:
  receive data from one or more other devices via the single bus;
  determine whether the received data is first data or second data, the first data being formatted in accordance with the bus transport protocol of the single bus and the second data being formatted in accordance with the native CODEC protocol;
  process the first data according to the bus transport protocol of the single bus; and
  process the second data according to the native CODEC protocol.

2. The apparatus of claim 1, further comprising a compressor configured to:
 determine, based on a preamble portion of the second data, that the second data corresponds to the native CODEC protocol; and
 remove native CODEC protocol control data from the second data.

3. The apparatus of claim 2, wherein the native CODEC protocol control data includes at least one of the preamble portion, a validity portion of the second data, a user portion of the second data, a channel status portion of the second data, and a parity portion of the second data.

4. The apparatus of claim 1, further comprising a decompressor configured to:
 receive third data to be sent via the single bus according to the native CODEC protocol; and
 add native CODEC protocol control data to the third data.

5. The apparatus of claim 1, wherein the bus interface device is configured to communicate via the single bus with a first device that is configured to decode data according to the bus transport protocol of the single bus and wherein the bus interface device is configured to communicate via the single bus with a second device that receives data independent of the bus transport protocol of the single bus.

6. The apparatus of claim 5, wherein the first device includes a serial low-power inter-chip media bus (SLIMbus)-compliant master device, a SLIMbus-compliant slave device, or a SLIMbus-compliant master/slave device, and wherein the second device includes a native CODEC protocol processor without any of a SLIMbus-compliant master device, a SLIMbus-compliant slave device, or a SLIMbus-compliant master/slave device.

7. The apparatus of claim 1, wherein the bus interface device includes a serial low-power inter-chip media bus (SLIMbus) master device and wherein the bus transport protocol includes a SLIMbus transport protocol.

8. The apparatus of claim 1, wherein the native CODEC protocol includes an international electrotechnical commission (IEC) 60958 (S/PDIF) audio protocol.

9. The apparatus of claim 1, wherein the native CODEC protocol includes an integrated interchip sound (I$^2$S) audio protocol or a pulse-code modulation (PCM) audio protocol.

10. A method comprising:
receiving, via a serial low-power inter-chip media bus (SLIMbus) data line, first data that is formatted in accordance with a bus transport protocol and second data that is formatted in accordance with an international electrotechnical commission (IEC) 60958 (S/PDIF) protocol;
compressing the second data to remove control data; and
passing the first data and the compressed second data to a device to enable the device to operate on data received in accordance with multiple protocols via the SLIMbus data line, wherein the multiple protocols include the bus transport protocol and the S/PDIF protocol.

11. The method of claim 10, wherein the second data is compressed in response to determining that the second data is formatted in accordance with the S/PDIF protocol.

12. The method of claim 10, wherein the compressing is performed at a SLIMbus master device, a SLIMbus slave device, or a SLIMbus master/slave device.

13. The method of claim 10, wherein the compressing is performed at a coding/decoding (CODEC) device coupled to the SLIMbus data line.

14. The method of claim 10, further comprising decompressing third data to be sent via the SLIMbus data line, wherein decompressing the third data includes adding control data in accordance with the S/PDIF protocol to the third data.

15. An apparatus, comprising:
means for receiving data from one or more devices via a single bus in accordance with multiple protocols, wherein the multiple protocols include a bus transport protocol of the single bus and a native coding/decoding (CODEC) protocol distinct from the bus transport protocol;
means for determining whether the received data is first data or second data, the first data being formatted in accordance with the bus transport protocol of the single bus and the second data being formatted in accordance with the native CODEC protocol;
means for processing the first data received via the single bus according to the bus transport protocol of the single bus; and
means for processing the second data that is received via the single bus according to the native CODEC protocol, wherein the apparatus handles protocol operations to enable a device coupled via the apparatus to the single bus to operate on data received in accordance with multiple protocols via the single bus.

16. The apparatus of claim 15, wherein:
the means for determining whether the received data is first or second data uses a preamble portion of the second data to determine that the received data is second data; and
the means for processing the second data removes native CODEC protocol data from the second data.

17. The apparatus of claim 15, further comprising:
means for receiving third data to be sent via the single bus according to the native CODEC protocol; and
means for adding native CODEC protocol control data to the third data.

18. The apparatus of claim 15, wherein the single bus comprises a serial low-power inter-chip media bus (SLIMbus) and wherein the native CODEC protocol comprises an international electrotechnical commission (IEC) 60958 (S/PDIF) audio protocol.

19. The apparatus of claim 15, wherein at least one of the means for receiving data, the means for processing the first data, and the means for processing the second data is integrated into a laptop computer, a tablet computer, a netbook computer, a smartbook computer, a smartphone, a set-top box device, an audio player, a video player, a navigation device, a communications device, a personal digital assistant (PDA), a computing device, or any combination thereof.

20. A tangible computer-readable medium comprising instructions that, when executed by a processor receiving data via a serial low-power inter-chip media bus (SLIMbus) data line in accordance with multiple protocols, cause the processor to:
determine whether the received data is first data formatted in accordance with a SLIMbus protocol or second data formatted in accordance with an international electrotechnical commission (IEC) 60958 (S/PDIF) protocol, wherein the multiple protocols include the SLIMbus protocol and the S/PDIF protocol;
compress the second data by removing control data from the second data; and
pass the first data and the compressed second data to a device to enable the device receiving data from the processor to operate on data received in accordance with multiple protocols via a SLIMbus data line.

21. The tangible computer-readable medium of claim 20, wherein the compressing is performed at a SLIMbus master device or at a coding/decoding (CODEC) device coupled to the SLIMbus data line.

22. The tangible computer-readable medium of claim 20, further comprising instructions that, when executed by the processor, cause the processor to:
decompress third data to be sent via the SLIMbus data line, wherein decompressing the third data includes adding control data in accordance with the S/PDIF protocol to the third data.

\* \* \* \* \*